US006487539B1

(12) United States Patent
Aggarwal et al.

(10) Patent No.: US 6,487,539 B1
(45) Date of Patent: Nov. 26, 2002

(54) SEMANTIC BASED COLLABORATIVE FILTERING

(75) Inventors: Charu C. Aggarwal, Yorktown Heights, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/369,741

(22) Filed: Aug. 6, 1999

(51) Int. Cl.[7] .................................................. G06F 17/60
(52) U.S. Cl. ........................................................ 705/14
(58) Field of Search .............................. 705/1, 14, 26; 382/225; 707/3, 102

(56) References Cited

U.S. PATENT DOCUMENTS

| 5,754,938 A | * | 5/1998 | Herz et al. ..................... 705/74 |
| 5,835,087 A | * | 11/1998 | Herz et al. ................... 345/810 |
| 5,924,116 A | * | 7/1999 | Aggarwal et al. ........... 711/122 |
| 5,983,214 A | * | 11/1999 | Lang et al. ..................... 707/1 |
| 6,236,975 B1 | * | 5/2001 | Boe et al. ................. 705/14 X |
| 6,263,327 B1 | * | 7/2001 | Aggarwal et al. ............. 706/47 |
| 6,307,965 B1 | * | 10/2001 | Aggarwal et al. .......... 382/225 |

FOREIGN PATENT DOCUMENTS

| EP | 0 751 471 | * | 1/1997 | .................. 705/14 |
| WO | WO 98/33135 | * | 7/1998 | .................. 705/14 |

OTHER PUBLICATIONS

Dan R. Greenberg, Ph.D. "Building Consumer Trust with Accurate Product Recommendations", A White Paper on Like Minds WebSell 2.1. 1997.

"Autonomy—Knowledge Management and New Media Content Solutions", www.autonomy.com/valueprosition.html. Aug. 6, 1999.

"Providing Intelligent Online Customer Management During the Entire Customer Life Cycle", www.aptex.com/Products/services.htm. Aug. 06, 1999.

* cited by examiner

Primary Examiner—Stephen Gravini
(74) Attorney, Agent, or Firm—F. Chau & Associates, LLP (57) ABSTRACT

A method for providing product recommendations to customers in an e-commerce environment includes the step of generating content and compatibility representations of products corresponding to a plurality of customers. A similarity function is calculated between pairs of content attributes corresponding to the products. A similarity function is calculated between pairs of compatibility attributes corresponding to the products. The plurality of customers are clustered into a plurality of peer groups. For a given customer, a closest peer group of the plurality of peer groups is determined. At least one potential recommendation is then generated for the given customer based on the closest peer group.

26 Claims, 6 Drawing Sheets

SEMANTIC BASED COLLABORATIVE FILTERING

BACKGROUND

1. Technical Field

The present invention relates generally to an automated computer based method for making product recommendations over an electronic network. More particularly, the invention is directed to a method for making product recommendations using content and compatibility attributes. This approach is referred to herein as semantic collaborative filtering.

2. Background Description

With the recent increase in popularity of on-line shopping over the Internet, entities providing the shopping sites are interested in obtaining information about shoppers that would help in selling their products. Since it is often possible to track the shoppers at the various sites they visit, information concerning their buying habits may be ascertained and used by the shopping sites to provide personalized recommendations. To this end, several companies have become popular for providing techniques used to facilitate internet commerce.

For example, companies such as Likeminds, Inc. and Firefly Network, Inc. provide techniques for facilitating Internet commerce based on "collaborative filtering". In collaborative filtering, recommendations are made to a potential purchaser based on past explicit ratings by other customers. These techniques are particularly useful in those cases in which the products are homogenous in nature. For example, in the case of Likeminds, customers are asked to provide ratings with respect to their preferences of a particular product such as compact discs. The ratings are based on the degrees of like and dislike a customer may have for the particular product in question. These ratings are then collected and archived for later use. At some point in the future a product recommendation will be made to a new customer based on the previously archived data of other customers.

However, the pure collaborative filtering approach does not work well if customers do not partake in the explicit rating of products. Unfortunately, customers in an e-commerce environment typically prefer to minimize their time on-line and, thus, are usually unwilling to spend extra time rating products.

Nonetheless, even if customers are willing to explicitly rate products, such ratings may be difficult to manage. Thus, in some circumstances implicit ratings may be desirable for use in making product recommendations. Implicit ratings refer to the set of products which have been bought or browsed by a customer.

Thus, as an alternative to collaborative filtering (which uses explicit ratings), some of the techniques used by companies to facilitate Internet commerce are based on implicit ratings. For example, Net Perceptions is a company which uses implicit ratings of products to provide product recommendations.

One technique for obtaining explicit ratings is commonly referred to as "content-based" filtering. Content based filtering uses extracted texts and other information from e-commerce websites to provide recommendations to potential purchasers.

An example of content-based filtering is the intelligent infrastructure offered by Autonomy, Inc. This system provides an Agentware content server, which is a scaleable content personalization and organization engine for Internet information providers. This technique extracts key concepts from documents and websites to automate the categorization, cross-referencing, hyperlinking, and presentation of the information. The customer profiling system of this software enables information and service providers to understand the interests of customers and deliver personalized information.

Another company which provides intelligent servers is Aptex Software. Aptex uses a form of content-based filtering referred to as "content mining". In content mining, text and other unstructured content is automatically analyzed to make intelligent decisions and recommendations.

The use of content mining to provide product recommendations is described in U.S. Ser. No. 09/169,029, entitled "Content Based Method for Product-Peer Filtering, filed on Oct. 9, 1998, commonly assignee, and incorporated herein by reference. According to one aspect of that invention, a method for providing product recommendations to customers in an e-commerce environment, includes the steps of deriving product characterizations for each of said plurality of products. Individual customer characterizations are created on each of said customers based on usage of the product characterizations by each of the respective customers. Clustering is performed based on similarities in the customer characterizations, to form peer groups. Individual customers are categorized into one of the peer groups. Product recommendations are made to customers based on the customer characterizations and information from the categorized peer groups.

Despite the provision and availability of the above described recommendation techniques, a need still exists for a method which provides recommendations and affords substantial customer personalization to the product recommendation process, without resorting to explicit group product ratings.

SUMMARY OF THE INVENTION

The present invention is directed to a method for making product recommendations in an electronic commerce network.

According to a first aspect of the invention, there is provided a method for providing product recommendations to customers in an e-commerce environment. The method includes the step of generating content and compatibility representations of products corresponding to a plurality of customers. A similarity function is calculated between pairs of content attributes corresponding to the products. A similarity function is calculated between pairs of compatibility attributes corresponding to the products. The plurality of customers are clustered into a plurality of peer groups. For a given customer, a closest peer group of the plurality of peer groups is determined. At least one potential recommendation is then generated for the given customer based on the closest peer group.

According to a second aspect of the invention, the step of generating the content representations includes the steps of concatenating product descriptions of the products bought by an individual customer, and calculating a content vector from the concatenated product descriptions.

According to a third aspect of the invention, the step of generating the compatibility representations includes the steps of calculating a fraction of time that a categorical attribute takes on a given value, and calculating a compatibility vector from the calculated fraction of time.

According to a fourth aspect of the invention, the clustering step includes the step of calculating a similarity function between a pair of categorical values as a predefined function of a support of the pair of categorical values.

According to a fifth aspect of the invention, the clustering step includes the steps of calculating a content-similarity between the content vector of a particular customer and content centroids of the plurality of customers, and calculating a compatibility-similarity between the compatibility vector of the particular customer and compatibility centroids of the plurality of customers.

According to a sixth aspect of the present invention, the step of determining the closest peer group includes the steps of determining a predetermined number of closest clusters to the given customer, and designating a union of the closest clusters as the closest peer group.

According to a seventh aspect of the invention, the step of generating the at least one potential recommendation includes the steps of determining most frequently bought products by the customers in the closest peer group, and recommending at least one of the most frequently bought products to the given customer.

According to an eighth aspect of the invention, the method further includes the step of filtering the at least one potential recommendation using domain specific rules.

According to a ninth aspect of the invention, the filtering step includes the step of determining whether any of the domain specific rules are relevant to the given customer and the at least one potential recommendation. It is determined whether any of the relevant domain specific rules are violated, when any of the domain specific rules are relevant to the given customer and the at least one potential recommendation. The at least one potential recommendation is provided to the given customer, when any of the relevant domain specific rules are not violated.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to a method for making product recommendations in an electronic commerce network. The present invention can be generally characterized as including two stages, a preprocessing stage followed by an on-line querying stage.

A brief description of the method of the present invention will now be given. In the pre-processing stage, each product a customer has bought is represented in terms of content and compatibility attributes. The compatibility attributes are also referred to herein as semantic attributes. The content attributes correspond to the set of words which describe the product, and the compatibility attributes correspond to the categorical attributes on which compatibility relationships are defined. For example, with respect to clothing, the content attributes may include pants and shirts, and the compatibility attributes may include color and size. The content and compatibility attributes are then vectorized.

Clustering is then performed on the content and compatibility vectors to generate peer groups therefrom. A peer group is a collection of customers whose product preferences have been previously archived and whom display a pattern of product preferences similar to that of the new customer.

In the on-line querying stage, a request for recommendations is received from a given customer. The requesting customer's closest peer group is then determined and the product buying behavior of the customers in that peer group is used to generate a potential set of recommendations. These potential recommendations are filtered using certain rules corresponding to pre-specified domain knowledge. The filtered recommendations are then presented to a given user.

It is to be understood that the present invention may be implemented in various forms of hardware, software, firmware, special purpose processors, or a combination thereof. Preferably, the present invention is implemented in software as a program tangibly embodied on a program storage device. The program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed.

Figure 1:
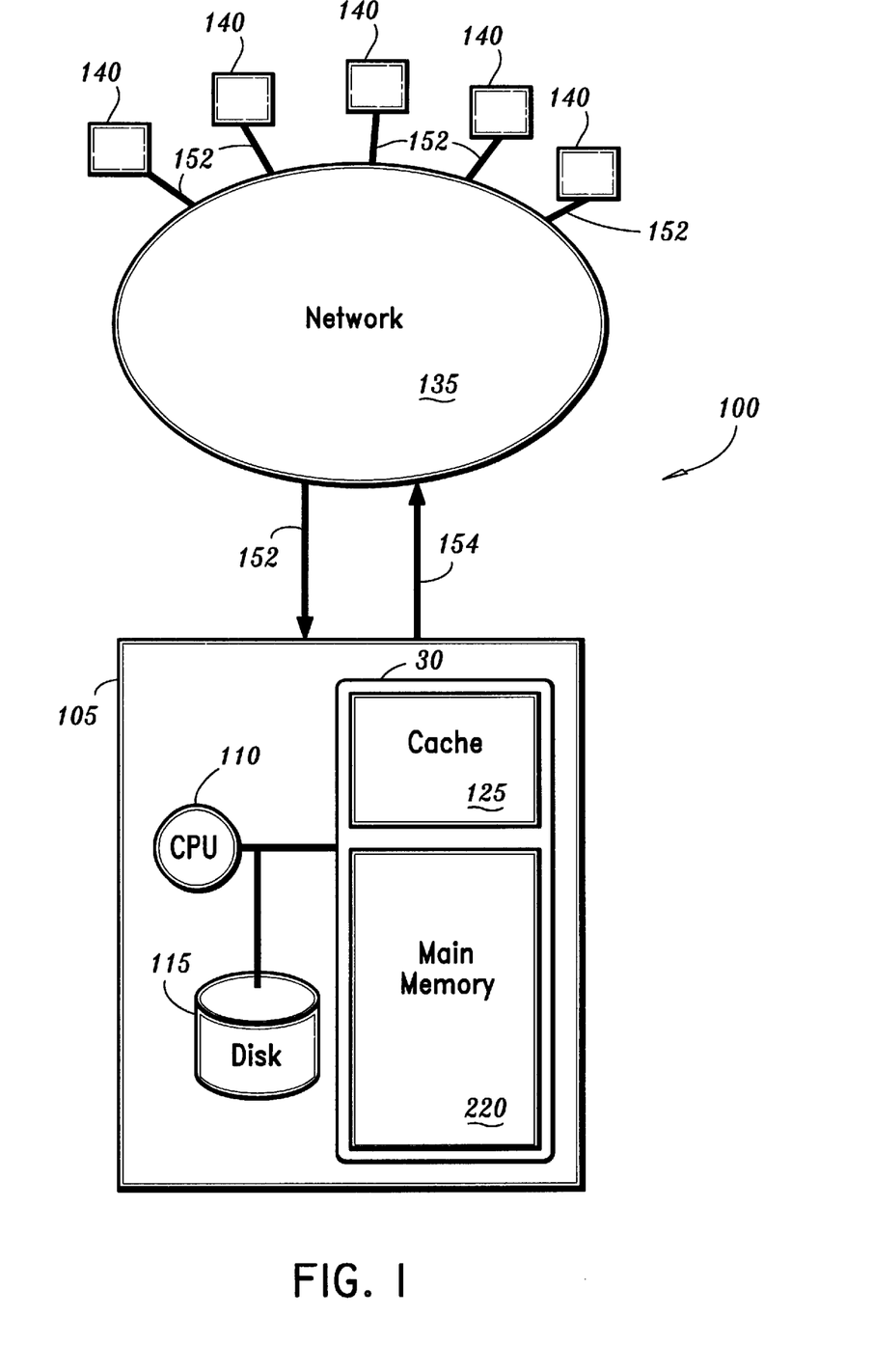
FIG. 1 is a block diagram of a computer processing system to which the present invention may be applied according to an embodiment of the present invention.

FIG. 1 is a block diagram of a computer processing system 100 to which the present invention may be applied according to an embodiment of the present invention. A server 105 is coupled to multiple clients or customers 140 over a network 135. The multiple customers 140 make requests (queries) 152 to the server 105 and the server 105 responds to the requests 152 by returning a result 154 for each query made.

The network 135 is an electronic commerce network capable of facilitating product sales and purchases. Preferably, the network 135 is the Internet.

The server 105 includes at least one processor (CPU) 110 for coordinating and controlling the server 105 and for performing the necessary computations for generating a query result 154. Main memory 220 acts as a data repository for each customer 140. The customer data may also reside on a disk drive subsystem 115 (e.g., magnetic, optical) or a cache subsystem 125.

As stated above, the products purchased by customers are described in terms of both content and compatibility attributes. A further description of the compatibility attributes will now be given.

The compatibility attributes may be classified into two groups, i.e., general trends and strict compatibility with domain knowledge. The classification of compatibility attributes as a general trend is based on the fact that certain trends in the categorical attributes often imply the presence of certain other attributes. For example, the presence of certain colors in the buying patterns of clothing customers may imply the presence or absence of certain other colors. On the other hand, strict compatibility in the domain knowledge is based on an exact rule of behavior.

The two types of compatibility attributes are illustrated by the following two statements. First, people who buy shirts of a particular color may show a trend of buying shirts of a similar color. Second, people who have bought a size 6 shirt will only buy another size 6 shirt.

The compatibility type corresponding to the first statement is based on a general trend, while the compatibility type corresponding to the second statement is based on specific domain requirements. The second statement is characterized as a strict compatibility requirement (in contrast to a general trend in the data) since it is based on an exact rule of behavior.

The present invention deals with these two types of compatibilities differently. The compatibility of the first type (general trends) is handled by a data mining algorithm which can detect the correlations among the different categorical attributes by incorporating them into distance measures. The compatibility of the second type (strict compatibility) is handled by using prespecified domain specific rules. It is to be appreciated that products often exhibit domain specific behavior which require tailoring of any corresponding recommendations.

Figure 2:
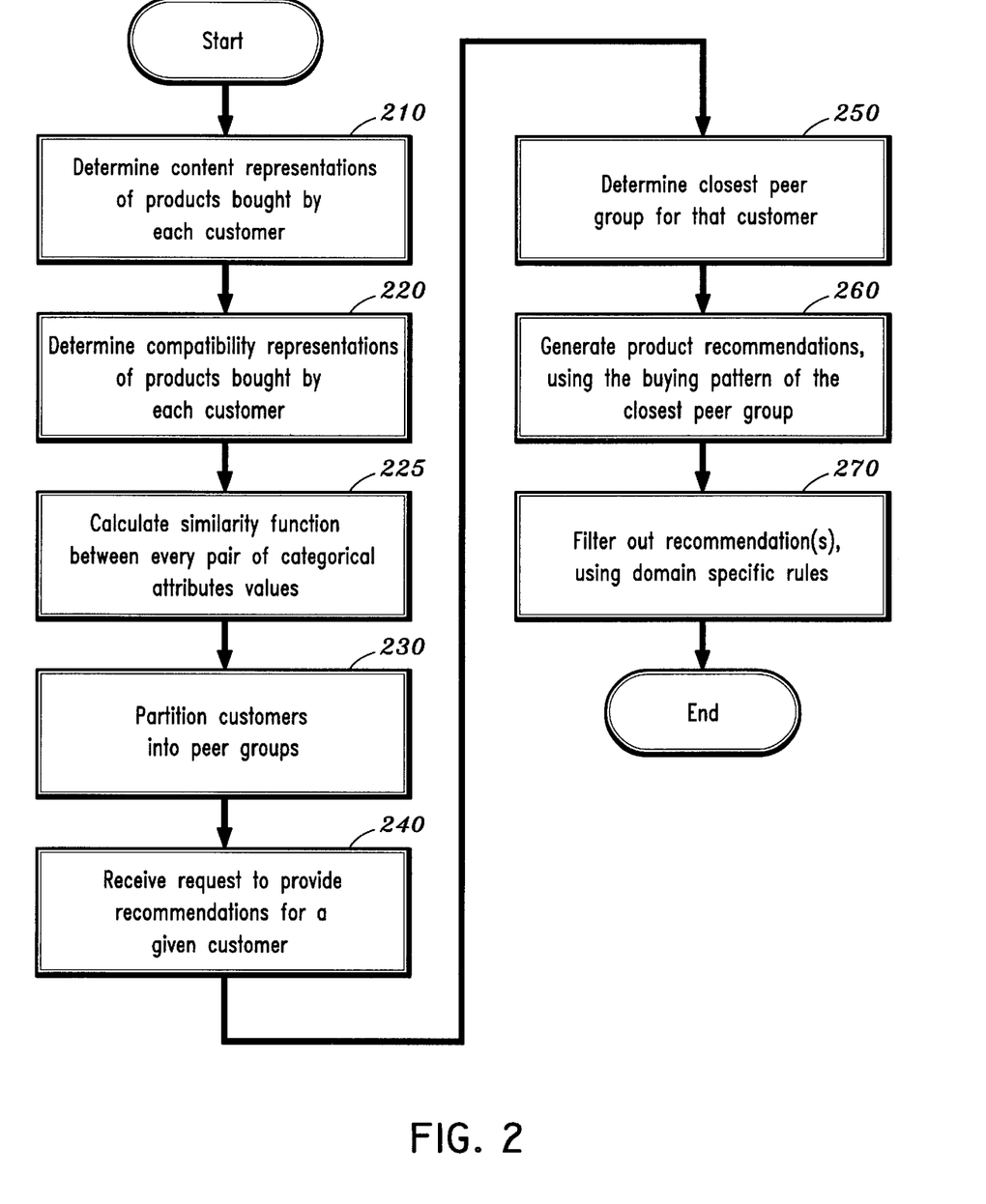
FIG. 2 is a flow chart of a method for providing product recommendations to customers in an e-commerce environment according to an embodiment of the present invention.

FIG. 2 is a flow chart of a method for providing product recommendations to customers in an e-commerce environment according to an embodiment of the present invention. Steps 210 through 230 correspond to the preprocessing phase of the method, and steps 240 through 270 correspond to the online query phase of the method. It is to be appreciated that the order of the steps illustrated in FIG. 2, as well as those shown in the other figures, may be readily varied by one skilled in the art. That is, for many of the steps described herein, their order of performance is not critical and thus may be altered for various reasons, such as, for example, to more quickly obtain recommendations or to better allocate the resources of the system(s) implementing the present invention.

In the preprocessing phase of the method of FIG. 2, the content representation of the products bought by each customer is determined (step 210). The content representation of the products bought by a given customer may be determined by concatenating the product descriptions of all the products that the customer has bought, and calculating a content vector from the concatenated content descriptions.

Thus, the content vector is the vector of all the words corresponding to all the products which are bought by a given customer. That is, the content vector is the union of all the text descriptions of the products bought by a given customer. We refer to this as the content-centroid of the given customer. Step 210 is more fully described with respect to FIG. 3.

The compatibility representation of the products bought by each customer is determined (step 220). This involves determining the complex values of the compatibility attributes of the products bought by each customer, and calculating a compatibility vector from the complex values. The complex values may be determined by looking at the categorical values of each compatibility attribute for all the products that a customer has bought.

Each compatibility attribute has a complex value which indicates the percentages for various values of the attribute. For example, consider a customer A, who bought the following four shirts:

Shirt 1: Color=Blue
Shirt 2: Color=Blue
Shirt 3: Color=Red
Shirt 4: Color=Green

In this case, the complex value of the attribute (hereinafter referred to as a "complex attribute value") for shirt-color for customer A is (0.5-Blue, 0.25 Red, 0.25 Green).

The compatibility vector is the vector of all the complex values for the compatibility attributes of the customer. Thus, there is one complex value for each compatibility attribute (hereinafter referred to as the "compatibility-centroid" of that customer). This is more fully described with respect to FIG. 4.

The similarity function $g(.,.)$ between every pair of categorical attribute values $v1$ and $v2$ is calculated (step 225). The calculated similarity function is used at step 250 hereinbelow.

The customers are partitioned (clustered) into peer groups (step 230). As stated above, a peer group is a collection of customers whose product preferences have been previously archived and whom display a pattern of product preferences similar to that of the new customer.

Methods for creating peer groups using clustering have been described in U.S. Ser. No. 09/070,600 (hereinafter the '600 patent application), entitled "System and Method for Detecting Clusters of Information", filed on Apr. 30, 1998, commonly assigned, and incorporated herein by reference.

It is to be appreciated that while the present invention may employ clustering as described in the '600 patent application, the present invention is not limited to only the clustering techniques described therein. Thus, other clustering techniques may be used in accordance with the present invention to form peer groups.

In the online phase of the method of FIG. 2, a request is received to provide recommendations for a given customer (step 240). The closest peer group for that customer is then determined (step 250). Step 250 may be performed by finding the k closest cluster centroids to the customer's buying history. All the individuals in these k closest clusters are used as the peer group. However, one skilled in the art may readily modify the present invention so that less than all the individuals are used. To that end, a thresholding or other filtering scheme may be used.

Once the closest peer group has been determined, product recommendations are generated using the buying pattern of the closest peer group (step 260). In particular, the most frequently bought products in the closest peer group are used to provide the recommendations.

Domain specific rules are then used to filter out recommendations for that customer (step 270). A RULE is defined using the following format:

Customer Buying History===>(Current Recommendation Compatibility Check)

There are two kinds of compatibility relationships with respect to the domain specific rules, i.e., uni-attribute compatibility and multi-attribute compatibility. In uni-attribute compatibility, a single attribute defines the compatibility. For example, consider the following rule:

Clothing-color=blue===>Clothing-color=red or blue

In this case, the rule specifies that a customer who bought either blue or red clothing in the past must also buy blue or red clothing in the future. The single attribute considered in the preceding example is color.

In multi-attribute compatibility, a combination of one or more attributes are used to express the compatibility conditions. For example, a rule for multi-attribute compatibility could be as follows:

Clothing=Shirt, Size=6===>Clothing=shirt (size=6 - - - Key compatibility attribute)

Clothing=Shirt, Size=6===>Clothing=pant (size=9 - - - Key compatibility attribute)

Clothing=Shirt, Color=Gray===>Clothing=pant (color=Gray|Black|Blue - - - Key compatibility attribute)

Clothing=Shirt, Color=Gray===>Clothing=pant (Color=Black|Blue - - - Key compatibility attribute)

Note that the "|" notation in the above rules denotes the boolean function "OR". The key compatibility attribute is the one which needs to be satisfied by the rule, if other attributes are satisfied (i.e., if the rule is determined to be relevant). Otherwise, the rule is said to have been violated. If a potential recommendation violates any of the rules, then the recommendation is not used (i.e., provided to a customer). That is, for a potential recommendation to be used, it must not violate any rules.

A rule is considered to be relevant for a given customer and a potential recommendation if the rule satisfies the following two conditions. First, the antecedent conditions of the rule should match the buying history of the customer. In other words, the customer must have bought at least one product satisfying the antecedent conditions. Second, the result of the rule (except for the key compatibility attribute) should satisfy the potential recommendation. A rule is considered to be violated if the rule is relevant to a customer-recommendation pair, but the key compatibility attribute does not match the potential recommendation.

Figure 3:
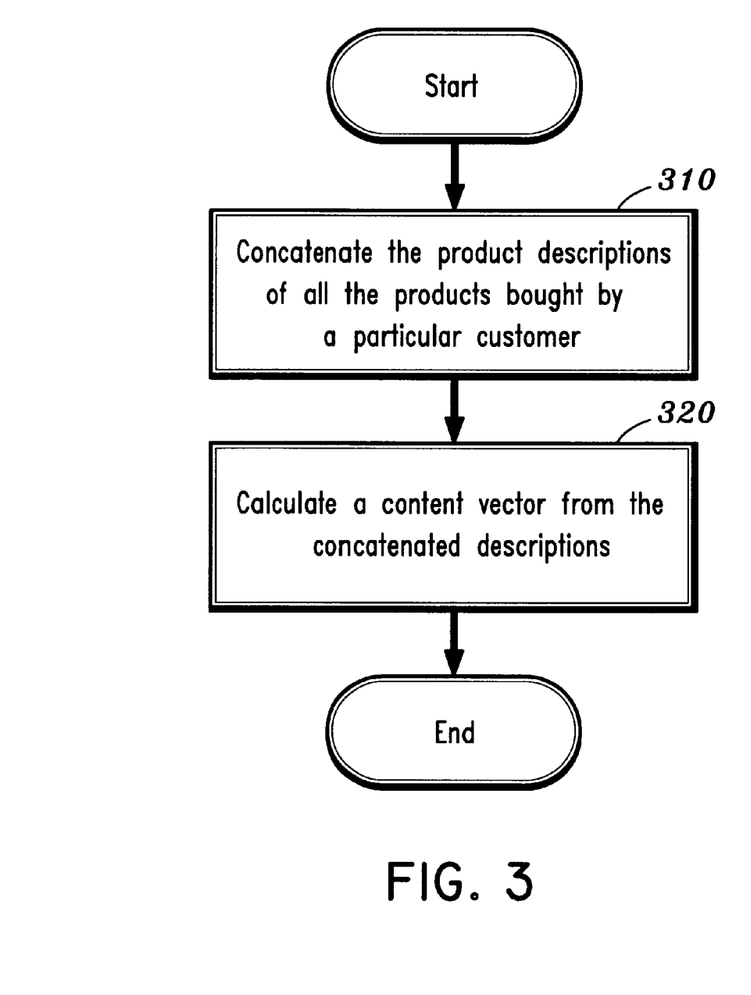
FIG. 3 is a flow chart of the steps associated with step 210 of the method of FIG. 2 according to an embodiment of the present invention.

FIG. 3 is a flow chart of the steps associated with step 210 of the method of FIG. 2 according to an embodiment of the present invention. In particular, FIG. 3 describes how the content representations of the different customers are created.

The content representation of the products bought by a given customer is determined by concatenating the product descriptions of all the products that a customer has bought (step 310). The content vector for that customer is then calculated using the concatenated descriptions (step 320). That is, the concatenated descriptions are vectorized to generate the content vector. The content vector of a given customer is also referred to herein as the content-centroid of that customer.

Figure 4:
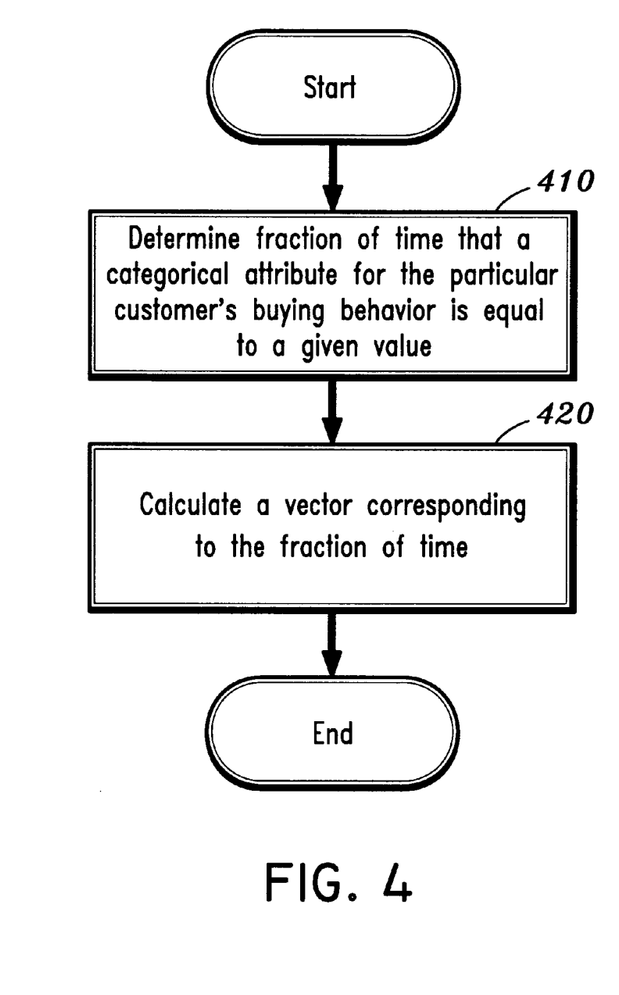
FIG. 4 is a flow chart of the steps associated with step 220 of the method of FIG. 2 according to an embodiment of the present invention.

FIG. 4 is a flow chart of the steps associated with step 220 of the method of FIG. 2 according to an embodiment of the present invention. In particular, FIG. 4 describes how the compatibility representations of the different customers are created.

The fraction of time (hereinafter referred to as "$f\_i$") that a categorical attribute for that customer's buying behavior is equal to the value $v\_i$ is determined (step 410). The vector ($f\_1, \ldots, f\_k$) is then calculated using the determined fraction of time (step 420). That is, the fraction of time is vectorized.

A description of how the closest peer group is determined will now be given. It is to be appreciated that finding the closest peer group involves finding the overall similarity between the customers.

The overall similarity between two customers A and B is defined as follows:

Similarity($A,B$)=theta*Content-Similarity($A,B$)+(1−theta)*Compatibility-Similarity($A,B$)

Here, theta is a number between 0 and 1 which indicates the degree of weight to be assigned to each of the two types of similarity (i.e., content-similarity and compatibility-similarity).

The content-similarity is simply a standard cosine measure as described in Information Retrieval: Data Structures and Algorithms, Frakes and Baeza-Yates, Prentice Hall (1992). A brief description of this measure will now be given. Let A=($a1, a2, \ldots, ak$) and B=($b1, b2, \ldots, bk$). Then, cosine($A,B$)=(sum_$\{i=1\}$^k×$a1b1$)/((sqrt(sum_$\{i=1\}$^k×$a1$^2))×(sqrt(sum_$\{i=1\}$^k×$bi$^2))), wherein "/" represents division, "×" represents multiplication, and "^" represents an exponential power.

The compatibility-similarity between two attributes is slightly more difficult to measure. For this, we first need to define the concept of distance between two values of an attribute. Let $v1$ and $v2$ correspond to two values of a given attribute. We define the SUPPORT of the pair ($v1, v2$) as the percentage of customers who bought items such that they take on the values of both $v1$ and $v2$. Let $s(v1, v2)$ denote the support of the pair of categorical attributes $v1$ and $v2$. Then, the similarity between the categorical attributes $v1$ and $v2$ is a function of this support. Let $f(s(v1, v2))$ denote this value. The function $f(.)$ also satisfies the following properties:

(1) $f(.)$ lies between 0 and 1.

(2) $f(.)$ is an increasing function of the support.

(3) In the special case that $v1=v2$, the function $f(s(v1, v2))=1$.

We shall denote the value of $f(s(v1, v2))$ by $g(v1, v2)$. Now it is easy to define the compatibility-similarity for an attribute P. Let A and B be two customers, and P(A) and P(B) be the corresponding (complex) values of the compatibility attribute. Specifically, let $v1 \ldots vk$ be the possible values of the complex attribute P. Let $w1 \ldots wk$ and $w1' \ldots wk'$ be the corresponding percentages in the complex values for this attribute for customers A and B respectively. Then, the similarity of the customers A and B on the attribute P is defined as follows:

SUM_$\{i,j\}wi*wj'g(vi,vj)$.

Then, the overall compatibility-similarity between the customers A and B is defined by the average of the compatibility-similarity among the different attributes. As indicated earlier, a weighted average of compatibility-similarity and content-similarity is used to measure the similarity among the different users.

Figure 5:
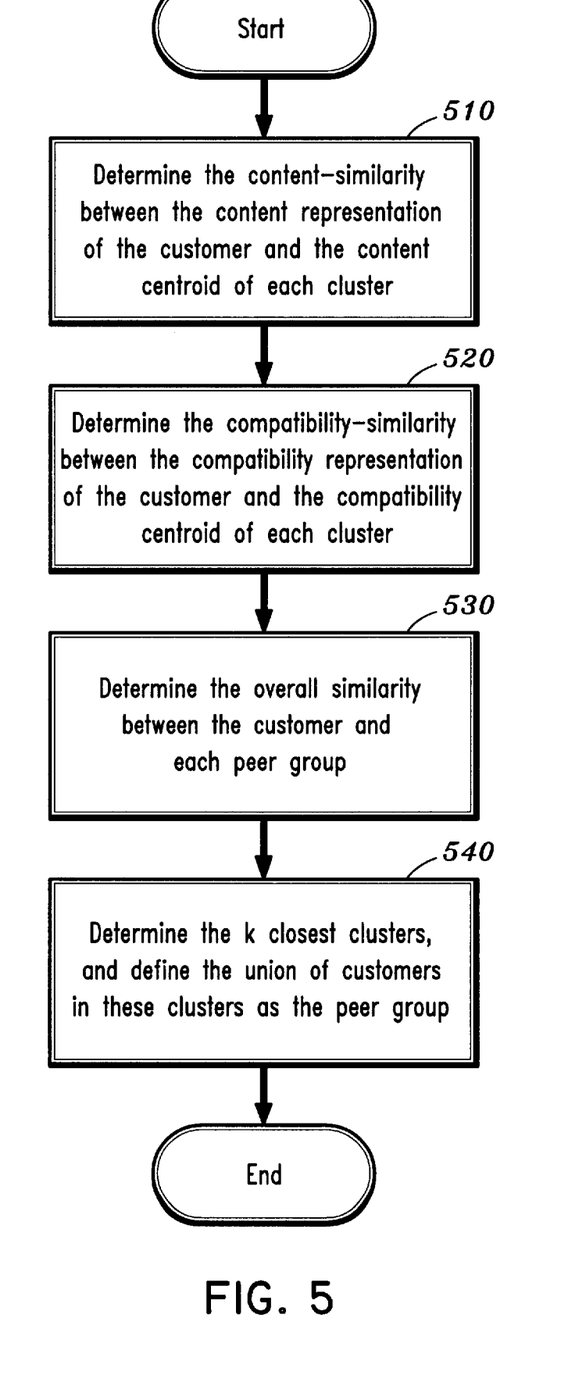
FIG. 5 is a flow chart of the steps associated with step 250 of the method of FIG. 2 according to an embodiment of the present invention.

FIG. 5 is a flow chart of the steps associated with step 150 of the method of FIG. 2 according to an embodiment of the present invention. In particular, FIG. 5 describes how the closest peer group of a given customer is determined.

The content-similarity between the content representation of the customer (i.e., the content vector of the customer) and the content centroid of each cluster is determined (step 510). This similarity is calculated using the standard cosine measure from the information retrieval literature, as described, for example, in the above referenced book by Frakes and Baeza-Yates.

The compatibility-similarity between the compatibility representation of the customer (i.e., the compatibility of the customer) and the compatibility centroid of each cluster is determined (step 520). To illustrate how step 520 is implemented, the following example is provided.

Consider the attribute color, which has three possible values: blue; green; and red. Let us consider the following pair of complex values for color:

Customer: Blue (0.2), Green (0.4), Red (0.4)

Cluster Centroid: Blue (0.3), Green (0.2), Red (0.5)

In this case, the similarity between the customer and the cluster may be calculated as follows:

$$0.2*0.3*(g(Blue, Blue)=1)+0.2*)0.2*g(Blue, Green)+ \\ 0.2*0.5*g(Blue, Red)+0.4*0.3*g(Green, Blue)+ \\ 0.4*0.2*(g(Green, Green)=1)+0.4*0.5*g(Green, Red)+ \\ 0.4*0.3*g(Red, Blue)+0.4*0.2*g(Red, Green)+0.4*0.5*(g(Red, Red)=1)$$

As indicated above, g(. , .) is the distance measure between two values of a categorical attribute. Note that the compatibility-similarity between two sets of complex vectors of compatibility attributes for two different customers is obtained by averaging the similarity over all the compatibility attributes.

The overall similarity between the customer and each peer group is determined (step 530). The overall similarity is a convex combination of the content-similarity and the compatibility-similarity of the cluster centroid to the customer. Specifically, the overall similarity is calculated as follows:

$$Overall\text{-}similarity=theta*Content\text{-}Similarity+(1- \\ theta)*Compatibility\text{-}Similarity$$

The k closest clusters to the customer are determined and the union of the customers in these clusters is defined as the peer group (step 540).

Once this peer group has been determined for a given customer, step 260 of the method of FIG. 2 uses the most frequently bought products in this group as the potential recommendations.

Figure 6:
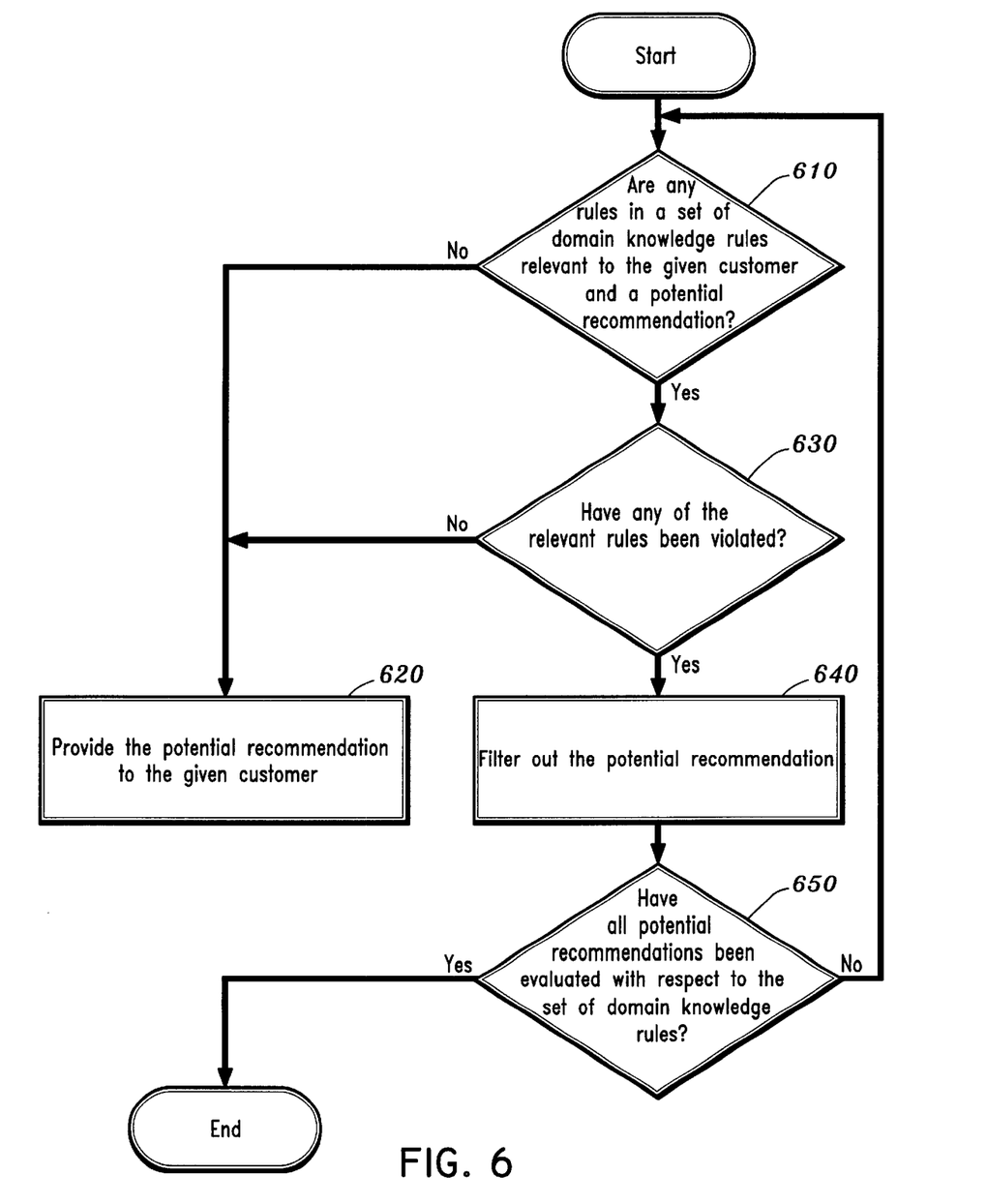
FIG. 6 is a flow chart of the steps associated with step 270 of the method of FIG. 2 according to an embodiment of the present invention.

FIG. 6 is a flow chart of the steps associated with step 170 of the method of FIG. 2 according to an embodiment of the present invention. In particular, FIG. 6 describes how potential recommendations are selected for filtering out.

For a given potential recommendation generated at step 260 of the method of FIG. 2, it is determined whether any of the rules in a set of domain knowledge rules are relevant to the given customer and potential recommendation (step 610). As indicated earlier, a rule is said to be relevant for a given customer and potential recommendation if the following two conditions are satisfied. First, the antecedents of the rule should match the buying history of the customer. That is, the customer must have bought at least one product which satisfies the antecedent conditions.

Second, the result of the rule (except for the key compatibility attribute) must satisfy the potential recommendation.

If none of the rules from the set of domain knowledge rules are relevant, then the potential recommendation is provided to the given customer (step 620). On the other hand, if one or more rules are relevant, then it is determined whether any of these rules have been violated (step 630).

A rule is said to have been violated, if it is relevant for that customer-recommendation pair, but the key compatibility attribute is not satisfied. If none of the relevant rules have been violated, then the method returns to step 620. On the other hand, if any of the relevant rules have been violated, then the potential recommendation is filtered out (step 640). It is then determined whether all of the potential recommendations for that given customer have been evaluated with respect to the set of domain knowledge rules (step 650). If so, then the method terminates (step 660). On the other hand, if all of the potential recommendations have not been evaluated, then the method returns to step 610 to evaluate any remaining potential recommendations (step 670).

Figure 7:
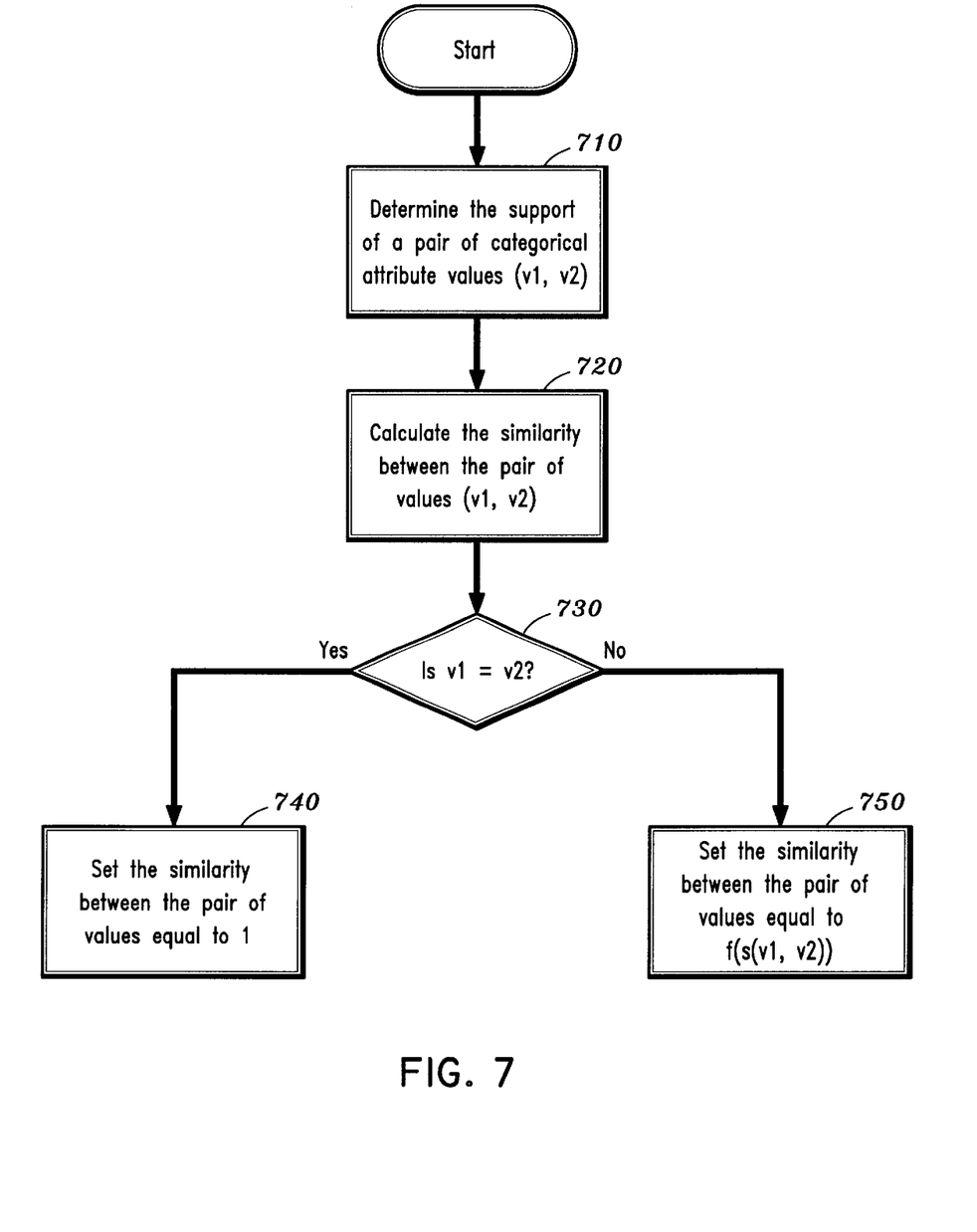
FIG. 7 is a flow chart of the steps associated with step 225 of the method of FIG. 2 according to an embodiment of the present invention.

FIG. 7 is a flow chart of the steps associated with step 225 of the method of FIG. 2 according to an embodiment of the present invention. In particular, FIG. 7 describes how to calculate the similarity g(v1, v2) between each pair of categorical values v1 and v2. The function f(.) maps the support of a pair of categorical attribute values to the similarity, and is used for each attribute and each pair of categorical values. However, it is to be appreciated that the function need not be applied to every attribute and pair of categorical values.

The support of the pair of categorical attribute values (v1, v2) is determined, which we denote by s(v1, v2) (step 710). The similarity between the pair of values (v1, v2) is then calculated (step 720). Next, it is determined whether v1=v2 (step 730). If so, then g(v1, v2) is set equal to 1 (step 740). Else, g(v1, v2) is set equal to f(s(v1, v2)) (step 750).

In sum, the present invention provides a method for providing product recommendations to customers in an e-commerce environment. The products purchased by customers are described in terms of both content and compatibility attributes. Domain specific rules are employed to filter out potential recommendations which are likely to not be useful to a customer. Accordingly, the present invention provides recommendations which are tailored to individual customers and are thus likely to provide useful information to the customers in making purchases.

Although the illustrative embodiments have been described herein with reference to the accompanying drawings, it is to be understood that the present method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for providing product recommendations to customers in an e-commerce environment, comprising the steps of:

extracting content information from products corresponding to a plurality of customers;

generating content representations of the products from the content information;

generating compatibility representations of the products;

calculating a similarity function between pairs of content attributes corresponding to the products;

calculating a similarity function between pairs of compatibility attributes corresponding to the products;

clustering the plurality of customers into a plurality of peer groups;

for a given customer, determining a closest peer group of the plurality of peer groups based on the similarity functions; and generating at least one potential recommendation for the given customer based on the closest peer group and an absence of explicit customer ratings.

2. The method according to claim 1, wherein said step of generating the content representations comprises the steps of:
   concatenating product descriptions of the products bought by an individual customer; and
   calculating a content vector from the concatenated product descriptions.

3. The method according to claim 1, wherein said step of generating the content representations further comprises the steps of extracting the product descriptions, when the individual customer at least one of browses and purchases the products.

4. The method according to claim 1, wherein said step of generating the compatibility representations further comprises the steps of:
   calculating a fraction of time that a categorical attribute takes on a given value; and
   calculating a compatibility vector from the calculated fraction of time.

5. The method according to claim 1, wherein said clustering step comprises the step of calculating a similarity function between a pair of categorical values as a predefined function of a support of the pair of categorical values.

6. The method according to claim 1, wherein said clustering step comprises the steps of:
   calculating a content-similarity between a content vector of a particular customer and content centroids of the plurality of customers; and
   calculating a compatibility-similarity between a compatibility vector of the particular customer and compatibility centroids of the plurality of customers.

7. The method according to claim 1, wherein said step of determining the closest peer group comprises the steps of:
   determining a predetermined number of closest clusters to the given customer; and
   designating a union of the closest clusters as the closest peer group.

8. The method according to claim 1, wherein said step of generating the at least one potential recommendation comprises the steps of:
   determining most frequently bought products by the customers in the closest peer group; and
   recommending at least one of the most frequently bought products to the given customer.

9. The method according to claim 1, further comprising the step of filtering the at least one potential recommendation using domain specific rules.

10. The method according to claim 9, wherein said filtering step comprises the steps of:
    determining whether any of the domain specific rules are relevant to the given customer and the at least one potential recommendation;
    determining whether any of the relevant domain specific rules are violated, when any of the domain specific rules are relevant to the given customer and the at least one potential recommendation; and
    providing the at least one potential recommendation to the given customer, when any of the relevant domain specific rules are not violated.

11. The method according to claim 10, wherein said filtering step further comprises the step of providing the at least one potential recommendation to the given customer, when none of the domain specific rules are relevant to the given customer and the at least one potential recommendation.

12. The method according to claim 10, wherein a domain specific rule is relevant for the given customer and the at least one potential recommendation when antecedent conditions of the domain specific rule match a buying history of the given customer and a result of the rule satisfies the at least one potential recommendation.

13. The method according to claim 10, wherein a domain specific rule is violated when the domain specific rules is relevant to the given customer and the at least one potential recommendation, but a key compatibility attribute does not match the at least one potential recommendation.

14. A program storage device readable by machine, tangibly embodying a program of instructions executable by the machine to perform steps for providing product recommendations to customers in an e-commerce environment, said method steps comprising:
    generating content and compatibility representations of products corresponding to a plurality of customers;
    calculating a similarity function between pairs of content attributes corresponding to the products;
    calculating a similarity function between pairs of compatibility attributes corresponding to the products;
    clustering the plurality of customers into a plurality of peer groups;
    for a given customer, determining a closest peer group of the plurality of peer groups based on the similarity functions; and
    generating at least one potential recommendation for the given customer based on the closest peer group and an absence of explicit customer ratings.

15. The program storage device according to claim 14, wherein said step of generating the content representations comprises the steps of:
    concatenating product descriptions of the products bought by an individual customer; and
    calculating a content vector from the concatenated product descriptions.

16. The program storage device according to claim 14, wherein said step of generating the content representations further comprises the steps of extracting the product descriptions, when the individual customer at least one of browses and purchases the products.

17. The program storage device according to claim 14, wherein said step of generating the compatibility representations further comprises the steps of:
    calculating a fraction of time that a categorical attribute takes on a given value; and
    calculating a compatibility vector from the calculated fraction of time.

18. The program storage device according to claim 14, wherein said clustering step comprises the step of calculating a similarity function between a pair of categorical values as a predefined function of a support of the pair of categorical values.

19. The program storage device according to claim 14, wherein said clustering step comprises the steps of:
    calculating a content-similarity between a content vector of a particular customer and content centroids of the plurality of customers; and
    calculating a compatibility-similarity between a compatibility vector of the particular customer and compatibility centroids of the plurality of customers.

20. The program storage device according to claim 14, wherein said step of determining the closest peer group comprises the steps of:

determining a predetermined number of closest clusters to the given customer; and designating a union of the closest clusters as the closest peer group.

21. The program storage device according to claim 14, wherein said step of generating the at least one potential recommendation comprises the steps of:

determining most frequently bought products by the customers in the closest peer group; and recommending at least one of the most frequently bought products to the given customer.

22. The program storage device according to claim 14, further comprising the step of filtering the at least one potential recommendation using domain specific rules.

23. The program storage device according to claim 22, wherein said filtering step comprises the steps of:

determining whether any of the domain specific rules are relevant to the given customer and the at least one potential recommendation;

determining whether any of the relevant domain specific rules are violated, when any of the domain specific rules are relevant to the given customer and the at least one potential recommendation; and providing the at least one potential recommendation to the given customer, when any of the relevant domain specific rules are not violated.

24. The program storage device according to claim 23, wherein said filtering step further comprises the step of providing the at least one potential recommendation to the given customer, when none of the domain specific rules are relevant to the given customer and the at least one potential recommendation.

25. The program storage device according to claim 23, wherein a domain specific rule is relevant for the given customer and the at least one potential recommendation when antecedent conditions of the domain specific rule match a buying history of the given customer and a result of the rule satisfies the at least one potential recommendation.

26. The program storage device according to claim 23, wherein a domain specific rule is violated when the domain specific rules is relevant to the given customer and the at least one potential recommendation, but a key compatibility attribute does not match the at least one potential recommendation.

\* \* \* \* \*